United States Patent [19]

Haley

[11] 4,249,794
[45] Feb. 10, 1981

[54] OPTICALLY COUPLED REMOTE CONTROL SYSTEM

[75] Inventor: Frank P. Haley, Upland, Calif.
[73] Assignee: FMC Corporation, San Jose, Calif.
[21] Appl. No.: 22,409
[22] Filed: Mar. 21, 1979
[51] Int. Cl.³ ............................................. G02B 5/16
[52] U.S. Cl. ............... 350/96.20; 250/227; 350/96.24
[58] Field of Search ............... 350/96.20, 96.10, 96.24; 250/227, 229; 340/365 P

[56] References Cited

U.S. PATENT DOCUMENTS

| | | | |
|---|---|---|---|
| 2,168,886 | 8/1939 | Roberts | 340/365 |
| 2,759,393 | 8/1956 | McLeod | 340/365 |
| 3,516,529 | 6/1970 | Shurtliff | 340/365 |
| 3,519,116 | 7/1970 | Koehn | 350/96.20 |
| 3,538,321 | 11/1970 | Longnecker et al. | 350/96.20 |
| 3,581,003 | 5/1971 | Leone et al. | 340/365 |
| 3,638,008 | 1/1972 | Keller et al. | 350/96.20 |
| 3,683,167 | 8/1972 | Rishton | 350/96.20 |
| 3,787,837 | 1/1974 | Allen et al. | 350/96.20 |
| 3,805,048 | 4/1974 | Brennesholtz | 350/96.20 |
| 3,856,127 | 12/1974 | Halfon et al. | 350/96.20 |
| 3,886,544 | 5/1975 | Narodny | 350/96.20 |
| 4,013,342 | 3/1977 | Narodny | 350/96.20 |
| 4,023,887 | 5/1977 | Speers | 350/96.20 |
| 4,170,731 | 10/1979 | Howell et al. | 350/96.20 |

FOREIGN PATENT DOCUMENTS

1946693 8/1970 Fed. Rep. of Germany ........ 350/96.20

*Primary Examiner*—Stewart J. Levy
*Attorney, Agent, or Firm*—W. W. Ritt, Jr.; L. B. Guernsey

[57] ABSTRACT

A system for remote control of an articulated loading arm, comprising a light source and a plurality of light actuated relays enclosed in an explosion-proof container, and a plurality of light-controlling switches mounted adjacent the loading arm. Light from the source is conveyed through a plurality of light pipes to the switches which either interrupt or transmit light to a plurality of optical fibers which are each connected between one of the switches and a corresponding one of the relays. The light pipes, switches and optical fibers can be used to control operation of the loading arm in a potentially explosive environment while the relays open valves and provide control of hydraulic fluid from the safety of the enclosed container. The controlled hydraulic fluid provides power to a plurality of hydraulic rams which operate the loading arm.

15 Claims, 14 Drawing Figures

FIG_4

FIG_5

FIG_6

FIG_7

FIG_8

FIG_9

FIG_11

FIG_10

OPTICALLY COUPLED REMOTE CONTROL SYSTEM

BACKGROUND OF THE INVENTION

1. Field of the Invention

This invention relates to optically coupled remote control systems, and more particularly to optically coupled systems for controlling the operation of marine loading arms.

2. Description of the Prior Art

Fluid loading arms constructed of articulated pipe are extensively used in the petroleum industry for transferring oil or other fluids between a jetty, wharf, or other loading station and a marine tanker moored alongside. Such an arm generally comprises an inboard boom or limb supported on a vertical riser pipe by pipe swivel joints to facilitate pivotal movement about horizontal and vertical axes, and an outboard boom or limb connected by a pipe swivel joint to the inboard limb so as to be pivotal relative thereto about a horizontal axis. The outer end of the outboard limb is adapted to be connected to a pipe manifold on a tanker located within the reach of the arm, such as by a remotely controlled coupler device.

Various electrically controlled actuators are used to open and close hydraulic valves which control fluid under pressure to raise and lower the outboard end of each of the limbs of the articulated arm, rotate the articulated arm about the riser pipe, connect and disconnect the outboard end of the arm from the tanker manifold and control the flow of fluid through the loading arm. Due to the possible presence of explosive vapors in the area surrounding the articulated loading arm, the design of the prior art electrical circuits is strictly regulated. Such regulation causes the design and construction of the prior art articulated loading arm to be rather expensive. The various switches, relays and other possible sources of electrical sparks must each be enclosed in an air-tight container. The explosion-proof containers about the various portions of the prior art equipment also cause the apparatus to be somewhat bulky. It is therefore important that a cheaper and more compact system be provided for controlling the operation of articulated loading arms in a potentially explosive environment.

SUMMARY OF THE INVENTION

The present invention comprises a system for remote control of an articulated loading arm using a plurality of light-operated actuators for controlling the various operations of the loading arm. Radiant energy from a light source is coupled to the actuators through a plurality of optical fibers and light interrupting switches. The light source and the actuators are housed in an explosion-proof container which may be mounted a distance away from the loading arm. Light from the light source is piped through the optical fibers to the light interrrupting switches which can be mounted at the loading arm. Light passes through the open switches and is conducted by other optical fibers to the light-operated actuators. Selector switches can be used to control a plurality of loading arms. The switches can be mounted in a hand held remote control box attached to the end of a relatively long cable of optical fibers. The optical cable can be rolled up like a garden hose for storage when the apparatus is not in use and can be unrolled to allow the remote control box to be moved to a convenient operating position on either the wharf or on a marine tanker being loaded or unloaded. Since there is no danger of explosions from the light energy being carried by the optical fibers the remote control box can be safely and conveniently moved to a wide variety of operating positions.

DESCRIPTION OF THE PREFERRED EMBODIMENT

Figure 1:
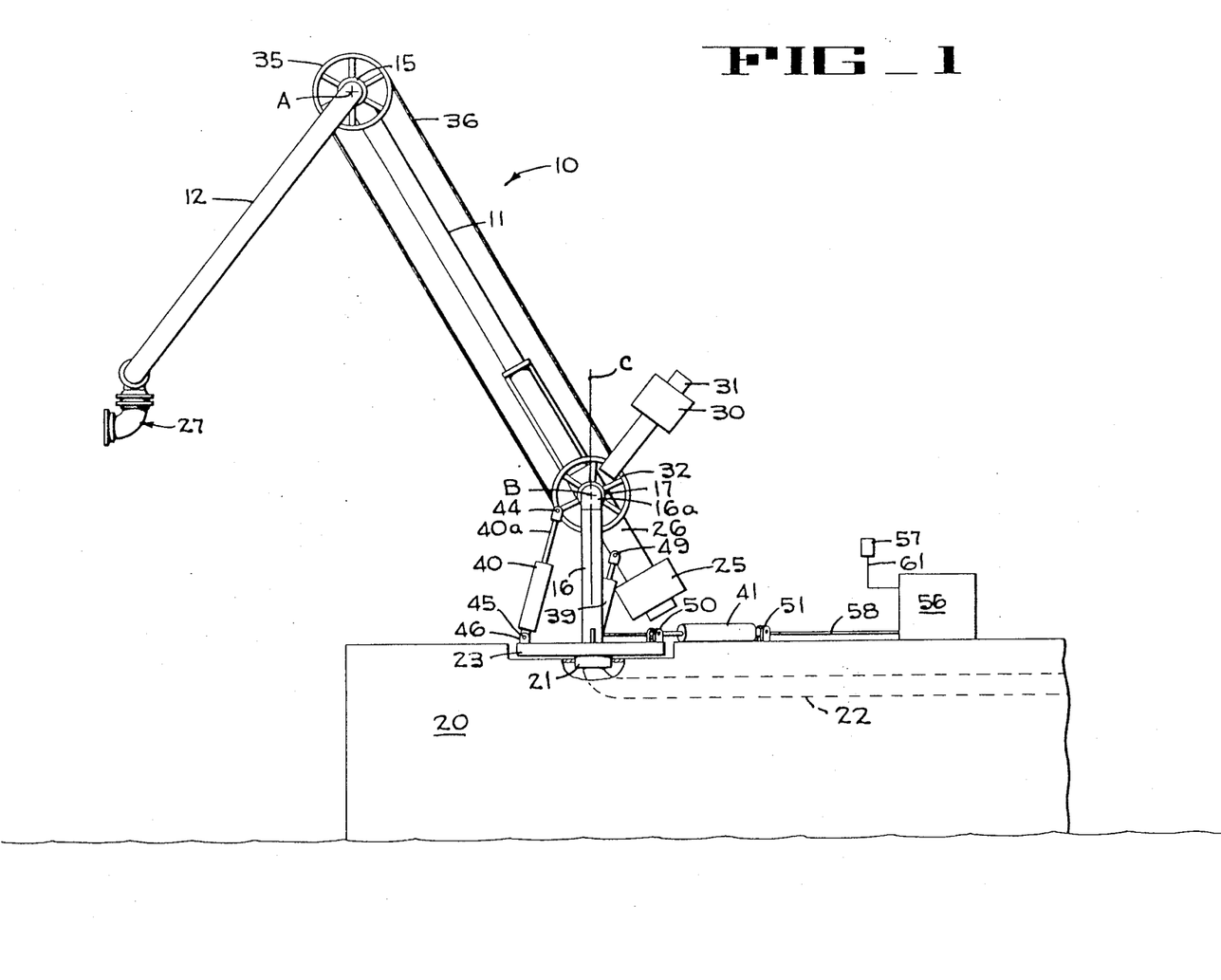
FIG. 1 is a schematic side elevation of an articulated fluid loading arm using the optically coupled remote control system of the present invention.

An optically coupled remote control system according to the present invention, as employed on a marine loading arm 10 designed for use in transferring petroleum or other fluid cargo between a marine tanker and a shore based reservoir or other facility, is diagrammatically represented in FIG. 1. The loading arm 10 comprises an inner pipe section 11, an outer pipe section 12 pivotally connected to the inner section through a swivel joint 15 with a horizontal axis A, and an upstanding riser pipe section 16 with a 90° pipe elbow 16a on which the inner section 11 is pivotally mounted by another swivel joint 17 with a horizontal axis B. The riser 16 is pivotally mounted on a wharf 20 by a swivel joint 21, and suitable piping 22 extends from the riser to a reservoir (not shown) for storage of fluid cargo.

A suitable mechanism for counterbalancing the inner and outer pipe sections 11, 12 about the horizontal axis B comprises a primary counterweight 25 mounted on a support beam 26 that is secured to the inner pipe section 11 and extends behind the riser 16. A pantograph system for counterbalancing the outer pipe section 12 and a coupling assembly 27 about the horizontal axis A comprises a counterweight 30 mounted on a beam 31 secured to a sheave 32 that is rotatably mounted about the horizontal axis B for independent rotation with respect to the inner pipe section 11, an outer sheave 35 secured to the outer pipe section 12 and mounted for rotation about the horizontal axis A independently of the inner pipe section 11, and an endless cable or the like 36 interconnecting the sheaves 32, 35. This system for counterbalancing the loading arm 10 is not critical to the present invention and it should be understood that other types of counterbalancing systems are also suitable.

Pivotal movement of the inner pipe section 11 and the outer pipe section 12 about the axis B is provided by a hydraulic ram 39, and pivotal movement of the outer pipe section 12 about the axis A is provided by a hydraulic ram 40. Power to slew the entire loading arm 10 about the riser axis C is provided by a hydraulic ram 41. The piston rod 40a of the hydraulic ram 40 is pivotally connected to the sheave 32 as by a pin 44, while the cylinder of the ram 40 is secured by a pin 45 and a clevis 46 to a base 23 that is fixed to and rotates with the riser 16. The hydraulic ram 39 is similarly connected to the beam 26 by a pin 49, and to the base 23 by another pin and clevis assembly (not shown). In like manner, the hydraulic ram 41 is connected between the base 23 and the wharf 20 by pin and clevis assemblies 50, 51, respectively.

Power to operate the hydraulic rams 39-41, along with a plurality of valves and couplers (not shown), is supplied by the usual hydraulic pumps and actuators which are housed in an explosion-proof container 56, which pumps and actuators are controlled by a plurality of optical switches contained in a remote control box 57. A plurality of hydraulic lines 58 supply pressurized hydraulic fluid to the hydraulic rams. An optical cable 61, containing a plurality of optical fibers or light pipes 61a-61n (FIGS. 1 and 2) extending between the control box 57 and the explosion-proof container 56, conducts optical signals to a plurality of relays in the container 56 that control the various actuators. The container 56 is shown as being mounted a short distance from the riser 16, but it should be understood that the use of optical fibers to carry signals from the control box 57 allow the container to be mounted at a location considerably further from the riser 16.

The remote control box 57 (FIGS. 1, 2, 4 and 5) can be a hand held unit, and the optical fiber cable can be relatively long. The cable can be rolled up like a garden hose and stored away when the remote control box 57 is not in use, and then unrolled and the control box carried to a convenient operating position when desired, such as on either the wharf 20 or on a marine tanker (not shown) that is to be loaded or unloaded at the wharf. The use of optical fibers in the cable greatly reduces the dangers from explosions, and allows the control box to be freely moved between a wide variety of operating locations without creating any hazard or potentially dangerous situation.

Figures 2, 3:
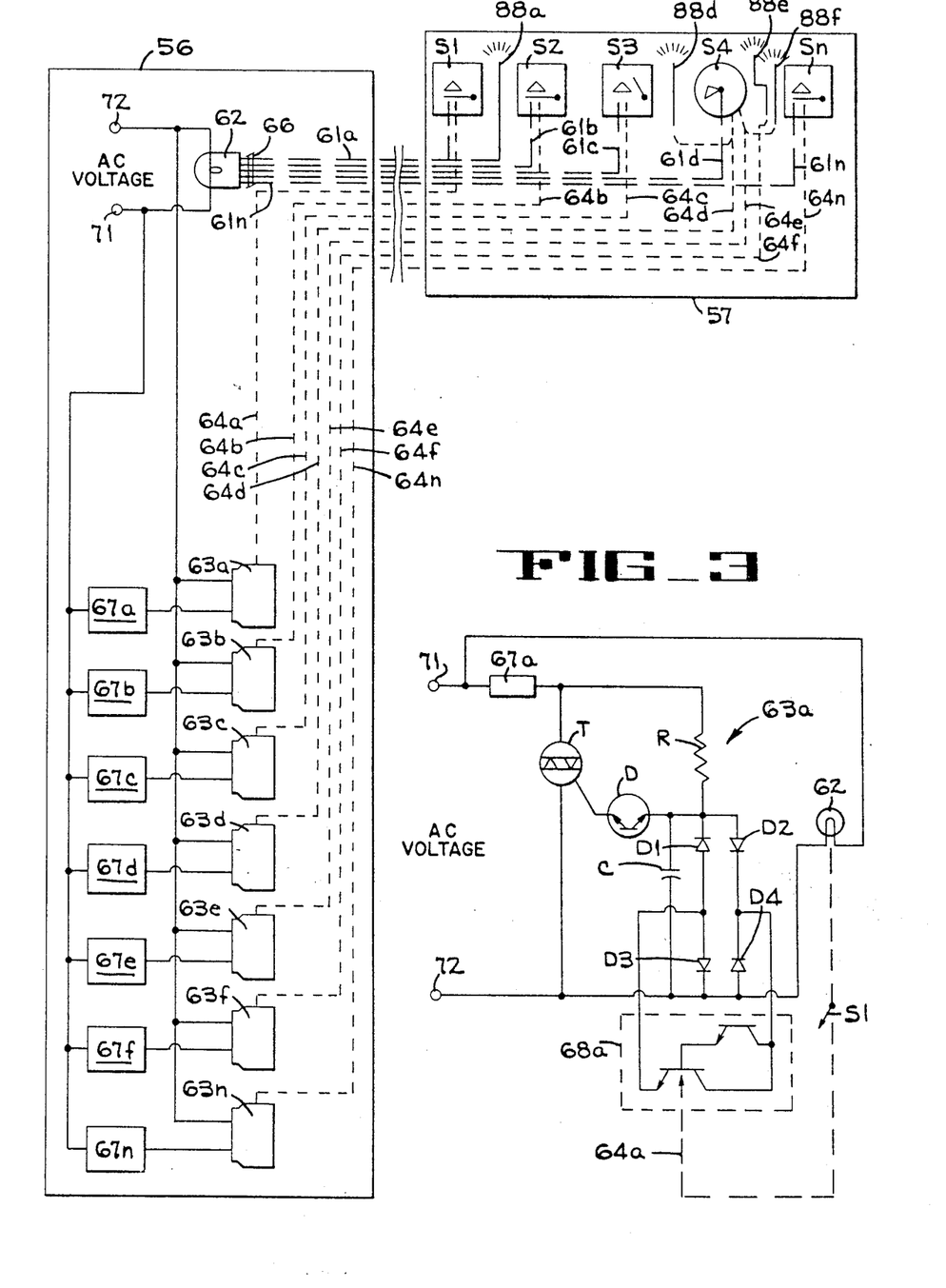
FIG. 2 is a schematic diagram representation of the optical circuitry for marine loading arms.
FIG. 3 is a schematic diagram of one of the light-actuated relays of FIG. 2.
Figure 4:
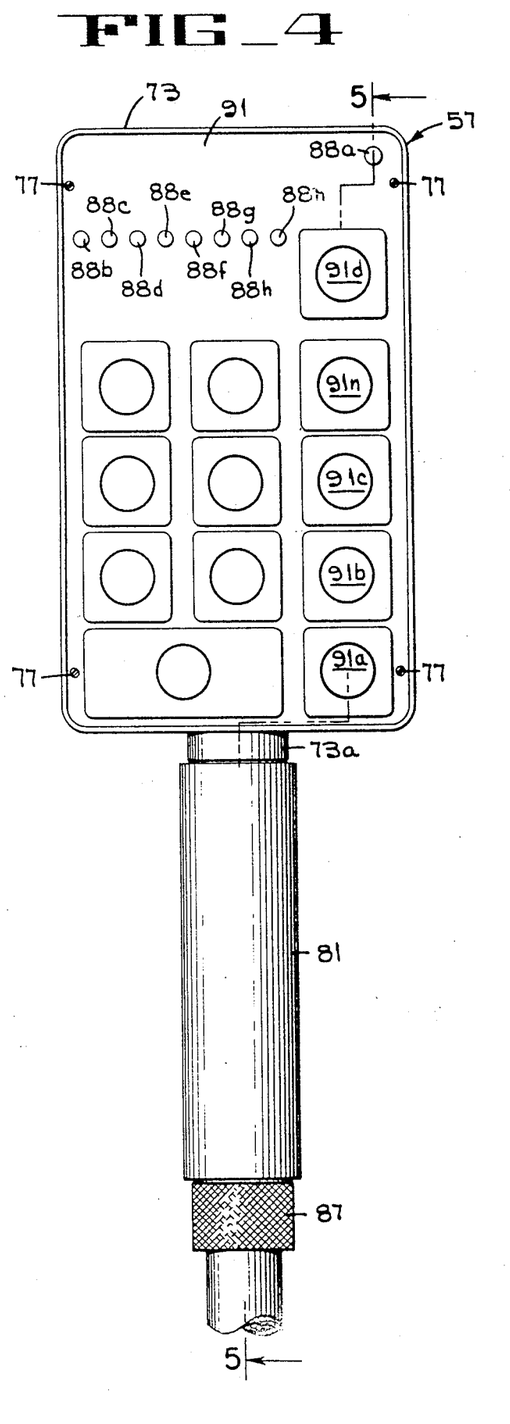
FIG. 4 is a schematic front elevation of an optical remote control unit of the present invention.
Figure 5:
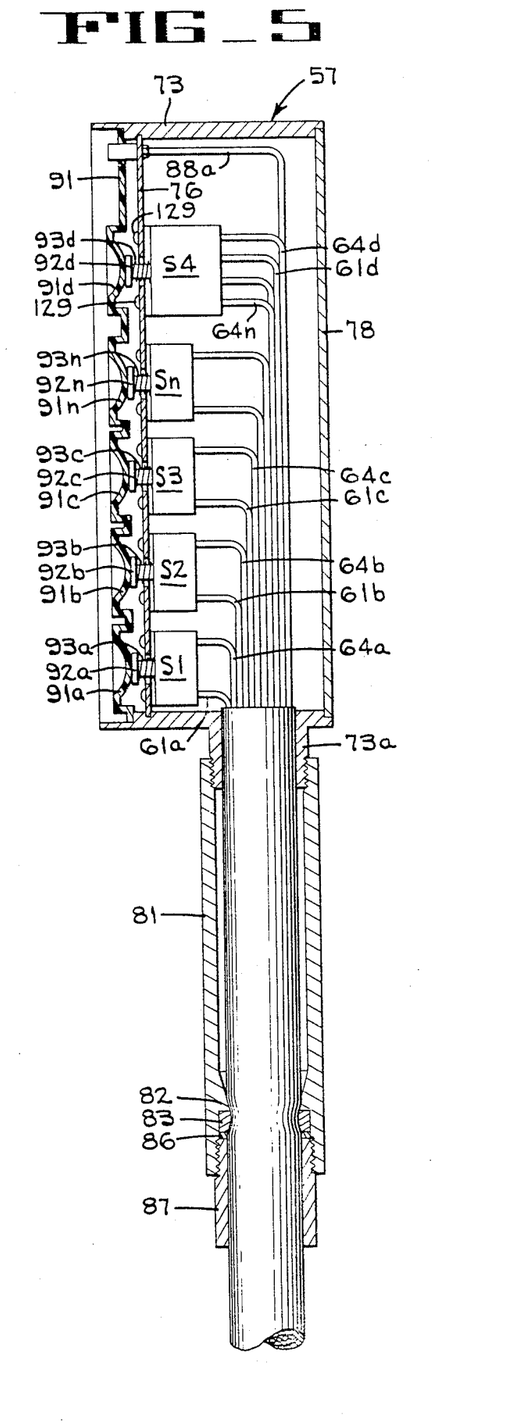
FIG. 5 is a vertical section of the optical remote control unit taken along line 5—5 of FIG. 4.

As is better observed in FIG. 2, the optically coupled control system includes a source of electrical power connected to a pair of input terminals 71, 72 for operating a light source 62 and a plurality of optically-triggered solid-state relays 63a-63n, all of which are mounted in the container 56. Light from the source 62 is guided by a fiber coupler 66 into the ends of each of the source fibers 61a-61n which couple the light to a plurality of light switches S1-Sn in the control panel 57. Light flows through the closed light switches into a plurality of return optical fibers or light pipes 64a-64n and is guided to the optically-triggered solid-state relays 63a-63n (FIGS. 2 and 3). The relays each control electrical power to a corresponding one of the actuators or other loads 67a-67n (FIG. 2).

The solid-state relays 63a-63n may be of the type shown in FIG. 3, comprising a triac T, a diac D, a resistor R, a light-actuated photo Darlington amplifier 68a, a capacitor C and a plurality of diodes D1-D4. The photo Darlington amplifier 68a may be one of several types such as the 2N5779 built by Motorola Semiconductor Products, Phoenix, Arizona. Light from the source 62 coupled through the optical switch S1 causes the photo Darlington amplifier 68a to be rendered conductive so that on one half of the a.c. voltage cycle, current flows from the terminal 72 through the diode D4, the photo Darlington amplifier 68a, the diode D1, the diac D, the triac T and the actuator 67a to the terminal 71, thereby firing the triac T. On the other half of the a.c. voltage cycle, current flows from the terminal 71 through the actuator 67a, through the triac T, the diac D, the diode D2, the photo Darlington amplifier 68a and the diode D3 to the terminal 72, thereby firing the triac T. On each half of the a.c. voltage cycle, current to operate the actuator 67a flows between terminals 72 and 71, through the fired triac T and the actuator, thereby energizing the actuator 67a. When the switch S1 prevents light from falling on the photo Darlington amplifier, this amplifier has a very high resistance so that there is not enough current to fire the triac T, and thus the actuator 67a is deenergized.

The remote control box 57 (FIGS. 4 and 5) includes a housing 73 with a front mounting plate 76 attached thereto by a plurality of screws 77, and with a back cover 78 which is glued or otherwise attached to the housing 73. The lower portion of the control box includes a generally cylindrical portion 73a having a cylindrical handle 81 threaded thereto. The lower portion of the handle 81 (FIG. 5) includes an annular inward flange 82 with an annular compression grommet 83 compressed between the flange 82 and an annular washer 86. A knurled nut 87, having screw threads on the upper end thereof, is threaded to the lower end of the handle 81. The optical fibers 61a-61n and 64a-64n pass through the handle 81 and are connected to the switches S1-Sn that are mounted to the front mounting plate 76.

A plurality of short indicator fibers 88a, 88d, 88e, 88f (FIGS. 2, 4, and 5) are each connected to a corresponding one of the return fibers 64a, 64d, 64e, 64f. The ends of the indicator fibers are each mounted in an opening in the front mounting plate 76 of the housing to indicate the operation of the switch S4 and the light source 62. Whenever the source 62 provides light to the fibers 61a-61n, light is coupled from the fiber 61a to the fiber 88a which emits light from the end thereof to indicate that light source is operating properly. One of the indicator fibers 88d-88f also emits light from the end thereof to indicate which one of the light pipes 64d-64f is coupled to the source fiber 61d by the rotary switch S4. The other indicator fibers 88b, 88c, 88g-88j shown on the front of the control box 57 (FIG. 4) can be connected to indicate the closed position of other optical switches.

A flexible touch button plate 91 mounted on the front of the remote control box 57 (FIG. 5) includes a plurality of touch buttons 91a-91n each mounted adjacent a corresponding one of a plurality of push buttons 92a-92n. The push buttons are connected to the switches S1-Sn and are biased in an open position by a corresponding one of the springs 93a-93n (FIGS. 5-7 and 9–11). An inward pressure on any one of the touch buttons applies actuating pressure to a corresponding one of the push buttons, causing one of the switches S1–Sn to move to a closed position from a normally open position, or to move to an open position from a normally closed position. The switches include a rotary multi-position switch S4 to select one loading arm from a bank of loading arms which can be controlled by the control box 57, and also includes a plurality of simple on-off optical switches.

Figure 6:
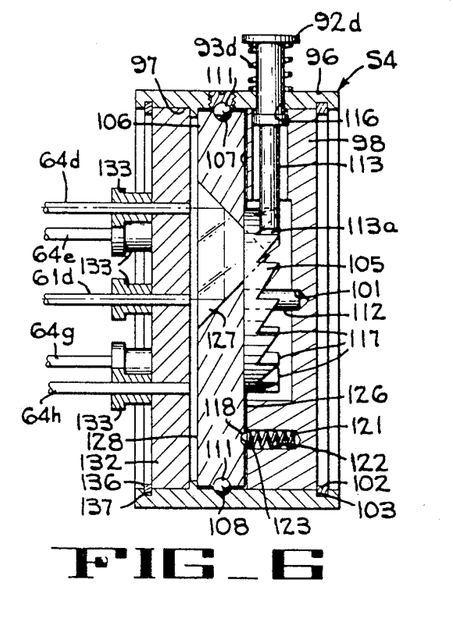
FIG. 6 is an enlarged vertical section of a rotary optical switch portion of the control unit of FIG. 5.
Figure 7:
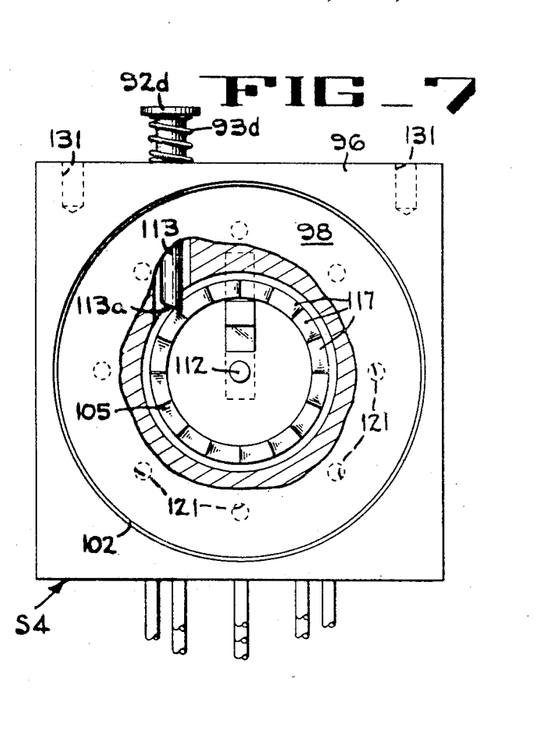
FIG. 7 is a schematic front elevation, with a portion broken away, of the rotary optical switch of FIG. 6.
Figure 8:
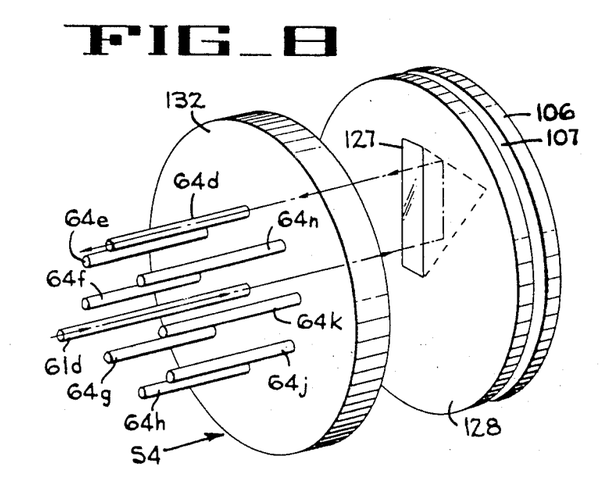
FIG. 8 is an isometric drawing of the rotary optical switch of FIG. 7.
Figure 9:
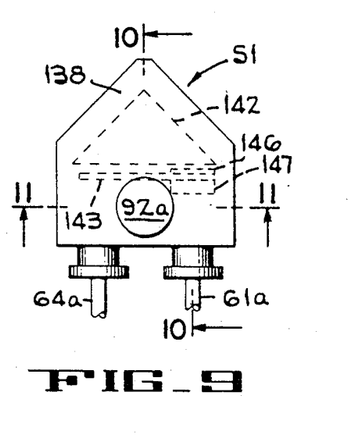
FIG. 9 is a schematic plan view of an optical switch used in the circuit of FIG. 2.
Figure 10:
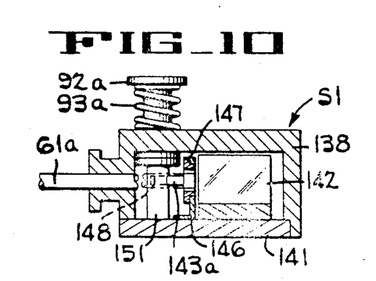
FIG. 10 is a section of the optical switch taken along the line 10—10 of FIG. 9.

The rotary arm-selector switch S4, shown in greater detail in FIGS 6–8, includes a generally square housing 96 having a cylindrical bore 97 extending therethrough. A circular back plate 98, having a shallow bore 101 extending part way through the center thereof, is retained in the bore 97 of the housing by an annular retaining ring 102 which is positioned in an annular groove 103. A cylindrical rotor 106 is rotatably mounted in the bore 97 and is secured in position by an annular groove 107 in the rotor and another annular groove 108 in the wall around the bore 97, wherein these grooves form a race for a plurality of ball bearings 111. A shaft 112 connected to the rotor 106 and rotatably mounted in the bore 101 provides a steady mount for the rotor. Means for rotating the rotor to select the loading arm to be used includes the push button 92d having an elongated shaft portion 113 extending through a hole 116 in the housing 96 and having a chisel-shaped end portion 113a and a ratchet ring 105 having a plurality of teeth 117. The ratchet ring is mounted on the rear portion of the rotor 106 with the teeth 117 below the lower end of the push button 92d. The push button is biased in an outward direction from the housing by the spring 93d. An inward push on the push button 92d presses the end portion 113a of the shaft against one of the plurality of teeth 117 (FIGS. 6 and 7) causing the rotor 106 to rotate in a counterclockwise direction (FIG. 7).

The rotor 106 is retained in any one of a plurality of operating positions by a ball 118 and a spring 121 (FIG. 6) mounted in a bore 122 in the back plate 98. As the rotor 106 rotates into one of the operating positions the spring forces a portion of the ball into one of a plurality of shallow semi-spherical holes 123 (FIG. 6) spaced around the rear face 126 of the rotor 106, causing the hole 123 to be aligned with the bore 122. In this operating position the incoming light from the optical fiber 61d (FIGS. 2 and 6–8) is reflected by a prism 127, mounted in the face 128 of the rotor 106, into one of the light pipes 64d–64n. Although the light pipes are shown as a single conductor in order to simplify the drawings, each of the pipes include several strands of optical fibers. One or two of these strands 88d–88n from each of the light pipes 64d–64n are routed to the face of the remote control box 57 (FIGS. 4 and 5) where light is emitted from the ends of these strands to indicate to the operator which one of the loading arms is in use. The various optical fibers 61d, 64d–64n are mounted through a front plate 132 (FIGS. 6 and 8) by a plurality of fiber connectors 133, and the front plate is held in place by an annular retainer ring 136 mounted in a groove 137 in the housing 96. The arm-selector switch is connected to the front mounting plate 76 of the control box by a pair of bolts 129 (FIG. 5) which are threaded into a pair of holes 131 (FIG. 7) in the housing 96 of the switch.

Figure 11:
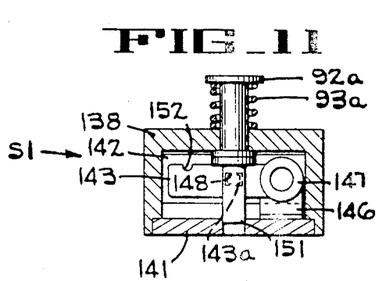
FIG. 11 is a section of the optical switch taken along the line 11—11 of FIG. 9.
Figure 12:
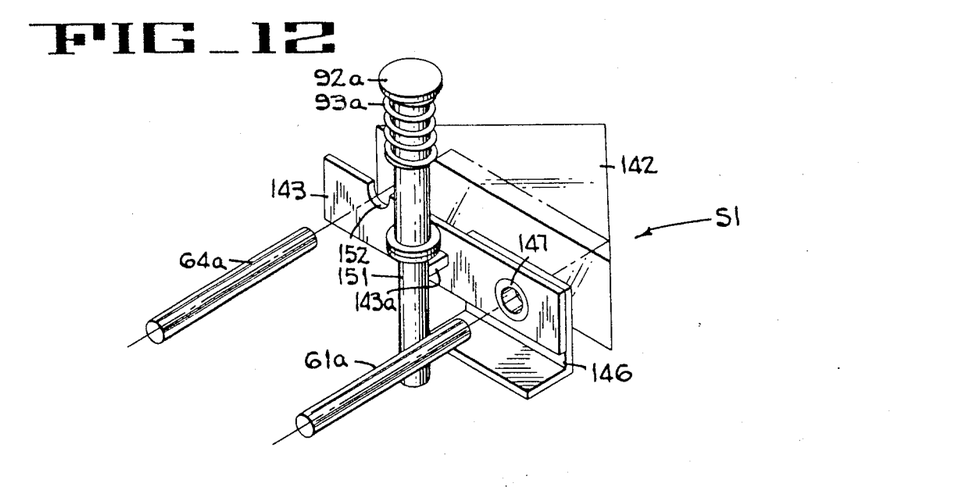
FIG. 12 is an isometric drawing of the optical switch of FIG. 9.

The momentary light switch S1, shown in greater detail in FIGS. 9–12, includes a housing 138 having a generally U-shaped configuration when viewed in FIG. 11. A bottom plate 141 (FIGS. 10 and 11), which is glued or otherwise connected to the housing, supports a right angle prism 142 (FIGS. 9 and 12) having a guillotine or knife blade 143 movably positioned adjacent the ends of the pair of optical fibers 61a, 64a. The blade is pivotally connected to an angle bracket 146 (FIG. 12) by a hollow rivet 147, and the angle bracket is secured to the bottom plate 141. The blade 143 includes a finger 143a (FIGS. 11 and 12) that fits in a hole 148 (FIG. 11) in a shaft portion 151 of the push button 92a. When the push button 92a is depressed, light from the optical fiber 61a passes through the hollow rivet 147 and is reflected by the prism 142 (FIG. 12) through a notch 152 in the blade 143 into the optical fiber 64a. When pressure on the push button is released the spring 93a returns the knife blade 143 to the closed position where the blade 143 intercepts and prevents the light from reaching the optical fiber 64a.

Figure 13:
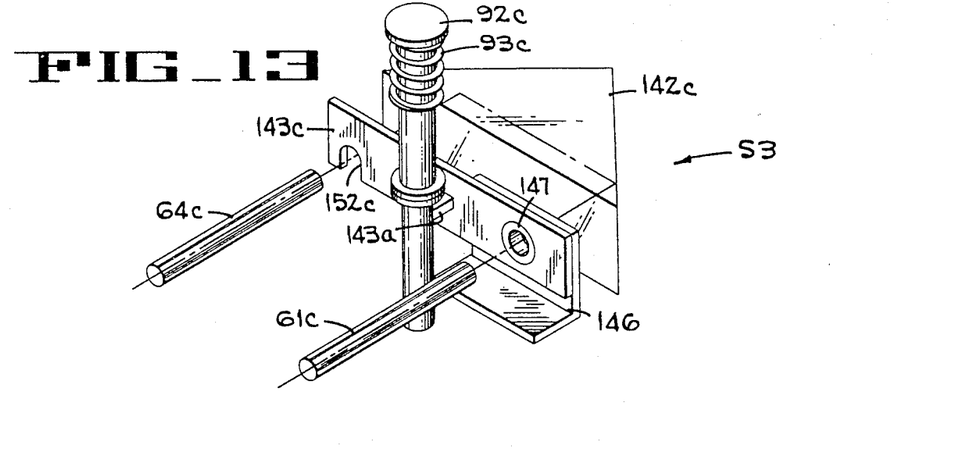
FIG. 13 is an isometric drawing of one embodiment of a proportional light switch for use in the present invention.

In the momentary closed switch S3, shown in greater detail in FIG. 13, a notch 152c has been placed in the lower portion of the blade 143c so that the upper portion of the blade blocks the light when the push button 92c is depressed, and allows light to pass from the optical fiber 61c through a prism 142c and the notch 152c to the optical fiber 64c when the push button 92c is released.

Figure 14:
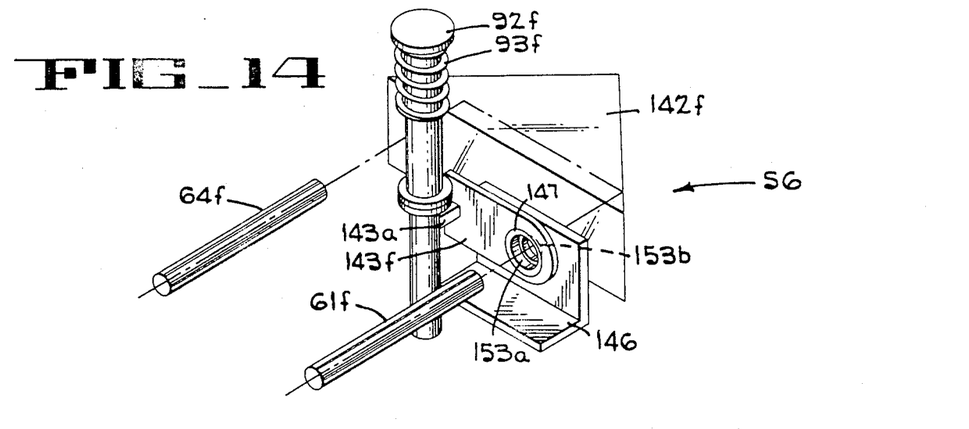
FIG. 14 is an isometric drawing of another embodiment of a proportional light switch for use in the present invention.

In a proportional light switch S6 shown in FIG. 14, a shorter knife blade 143f, having a first polarizing filter 153a rotatably mounted in the hollow rivet 147 and a second polarizing filter 153b fixedly mounted to the angle bracket 146, controls the amount of light transmitted between the optical fibers 61f and 64f. When a push button 92f is in the released position shown, the polarizing plane of the first filter 153a is oriented at right angles to the polarized plane of the second filter 153b so that little or no light passes through the two polarizing filters. As the push button 92f is depressed, the knife blade 143f and the filter 153a rotate counterclockwise, with the polarized plane of the filter 153a approaching alignment with the polarized plane of the second filter 153b and increasing the quantity of light transmitted from the optical fiber 61f to the fiber 64f. The quantity of light being transmitted is proportional to the amount of rotation of the first polarizing filter 153a.

The light from the optical fiber 64f can be coupled to a proportional valve or other proportional control to raise, lower or rotate a loading arm an amount which is proportional to the distance the push button 92f is depressed. The switch S6 can be used in a variety of other applications where proportional control of various types is desired. A single variable-density filter can be substituted for the pair of polarizing filters 153a, 153b to obtain a similar result.

The present invention provides means for safely controlling the operation of a plurality of loading arms or other equipment which may be operating in an explosive atmosphere. Optical fibers transmit light from a light source, through a variety of light controlling switches to operate light actuated relays that provide electrical signals to operate hydraulic valve actuators or other controls. The light source, relays, actuators and other electrical equipment can be mounted in explosion-proof containers located a safe distance from the equipment being controlled.

Although the best mode contemplated for carrying out the present invention has been herein shown and described, it will be apparent that modification and variation may be made without departing from what is regarded to be the subject matter of the invention.

What is claimed is:

1. Apparatus for using light signals to control the operation of an articulated loading arm comprising:
    a light source;
    a plurality of optical fibers;
    a plurality of optical switches, one of said optical switches including: a reflective prism, means for mounting a first end of said prism adjacent one end of a first one of said optical fibers means for mounting one end of a second end of said optical fibres adjacent a second end of said prism, a knife blade, means for pivotally mounting said knife blade between said prism and the end of said second optical fiber, and means for pivotally moving said knife blade away from the end of said second optical fiber to provide a path for light to pass between said prism and the end of said knife blade;
    means for connecting said fibers between said light source and a corresponding one of said optical switches;
    a plurality of light-operated actuator means for controlling the operation of a plurality of load devices; and
    fiber optic means for connecting each of said optical switches to a corresponding one of said actuator means.

2. Apparatus for using light signals as defined in claim 1 wherein each of said actuator means includes a light-operated relay and a hydraulic actuator for controlling pressurized fluid to operate one of said load devices.

3. Apparatus as defined in claim 1 wherein said prism is arranged to receive light from the end of one of said optical fibers and to reflect the light to the end of said fiber means when said knife blade is pivotally moved from between said prism and the end of said fiber means.

4. Apparatus as defined in claim 1 wherein said knife blade includes a notch in the portion adjacent the end of said fiber means to allow the passage of light from said prism to said fiber means with a minimum amount of pivotal movement of said knife blade.

5. Apparatus for using light signals to control the operation of an articulated loading arm, said apparatus comprising:
    a light source;
    a plurality of optical fibers;
    a plurality of optical switches;
    a rotary multiple position switch having a generally disc-shaped rotor, a support frame, means for rotatably mounting said rotor in said frame, means for mounting an input optical fiber with one end of said fiber adjacent the center of said rotor, a right-angle prism, means for mounting said prism on the face of said rotor with a portion of said prism adjacent the end of said input optical fiber, means for mounting a plurality of output fiber means with the ends of said fiber means at spaced intervals adjacent the periphery of said rotor, means for rotating said rotor and said prism in discrete steps, and means for stopping said rotation at a plurality of stations with a portion of said prism adjacent one of said output fiber means at each of said stations;
    means for connecting each of said fibers between said light sources and a corresponding one of said optical switches;
    a plurality of light-operated actuator means for controlling the operation of a plurality of load devices; and
    fiber optic means for connecting each of said optical switches to a corresponding one of said actuator means.

6. Apparatus as defined in claim 5 wherein light is transferred from said input fiber through said prism to a corresponding one of said output fiber means when said rotor stops at each of said stations.

7. Apparatus as defined in claim 5 wherein said means for rotating said rotor includes a plurality of teeth mounted at evenly spaced intervals and at positions equidistant from the center of said rotor, and a push button having a shaft portion which meshes with one of said teeth when inward pressure is applied to said push button, a predetermined pressure causing said rotor to move from one station to an adjacent station.

8. Apparatus as defined in claim 7 wherein a series of inward movements of said push button causes said rotor and said prism to move sequentially to each of said stations.

9. Apparatus for using light signals to control the operation of an articulated loading arm, said apparatus comprising:
    a light source;
    a plurality of optical fibers;
    a plurality of optical switches, each of said switches having: a reflective prism, means for mounting a first end of said prism adjacent one end of an input optical fiber, a pair of light polarizing filter, means for fixed mounting a first polarizing filter between said prism and said end of said input optical fiber, means for rotatably mounting a second polarizing filter between said prism and said end of said input optical fiber, push button means for rotating said second polarizing filter;
    means for connecting each of said fibers between said light source and a corresponding one of said optical switches;
    a plurality of light-operated actuator means for controlling the operation of a plurality of load devices; and
    fiber optic means for connecting each of said optical switches to a corresponding one of said actuator means.

10. Apparatus for using light signals to control the operation of a plurality of articulated loading arms by providing power to a plurality of hydraulic rams connected to the loading arms, said apparatus comprising;
    a light source;
    a plurality of optical fibers;
    a rotary multiple position switch having an input and a plurality of outputs;
    a plurality of proportional light switches each having: a support frame, a reflective prism, means for mounting said prism to said frame, means for mounting an input optical fiber with one end of said fiber adjacent a portion of said prism, a pair of light polarizing filters, means for fixed mounting a first polarizing filter between said prism and said end of said input optical fiber, means for rotatably mounting a second polarizing filter between said prism and said end of said input filter, push button means for rotating said second polarizing filter, and means for mounting one end of said fiber optic means between said prism and one of said actuator means;

means for connecting each of said optical fibers to a corresponding one of said proportional switches and to said input of said rotary switch;

a plurality of light-operated actuator means for controlling the operation of a plurality of load devices;

means for coupling said light-operated actuator means to said hydraulic rams; and fiber optic means for connecting each of said proportional switches and each output of said rotary switch to a corresponding one of said actuator means.

11. Apparatus for using light signals to control the operation of a plurality of articulated loading arms by providing power to a plurality of hydraulic rams connected to the loading arms, said apparatus comprising:

a light source;

a plurality of optical fibers;

a rotary multiple position switch having an input and a plurality of outputs;

a plurality of proportional light switches each having:

a reflective prism, means for mounting a first end of said prism adjacent one end of an input optical fiber, a variable density filter, means for rotatably mounting said filter between said prism and said end of said input optical fiber, push button means for rotating said filter, the quantity of light being transmitted through said filter being a function of the rotational position of said filter, and means for mounting fiber optic means between one of said actuators and a second end of said prism; means for connecting each of said optical fibers to a corresponding one of said proportional switches and to said input of said rotary switch;

a plurality of light-operated actuator means for controlling the operation of a plurality of load devices;

means for coupling said light-operated actuator means to said hydraulic rams; and fiber optic means for connecting each of said proportional switches and each output of said rotary switch to a corresponding one of said actuator means.

12. An optical switch for selectively interrupting light moving between the ends of two optical fibers, said switch comprising:

a reflective prism;

means for mounting a first end of said prism adjacent one end of a first of said optical fibers;

means for mounting a second end of said prism adjacent one end of a second of said optical fibers;

a knife blade;

means for pivotally mounting said knife blade between said prism and the end of said first optical fiber; and means for pivotally moving said knife blade away from the end of said first optical fiber to provide a path for light to pass between said prism and said end of said first optical fiber.

13. An optical switch for selectively coupling light from an input optical fiber to a predetermined one of a plurality of output optical fibers, said switch comprising:

a generally disc-shaped rotor;

a support frame;

means for rotatably mounting said rotor in said frame;

means for mounting an input optical fiber with one end of said fiber adjacent the center of said rotor;

a right-angle prism;

means for mounting said prism on the face of said rotor with a portion of said prism adjacent the end of said input optical fiber;

means for mounting said output fibers with the ends of said fibers at spaced intervals adjacent the periphery of said rotor;

means for rotating said rotor and said prism in discrete steps; and means for stopping said rotation of said prism at a plurality of stations with a portion of said prism adjacent one of said output fibers at each of said stations to provide a path for light to pass between said input fiber and a selected one of said output fibers at each of said stations.

14. Apparatus as defined in claim 13 wherein said means for rotating said rotor includes a plurality of teeth mounted at evenly spaced intervals and at positions equidistant from the center of said rotor, and a push button having a shaft portion which meshes with one of said teeth when inward pressure is applied to said push button, a predetermined pressure causing said rotor to move from one station to an adjacent station.

15. A proportional light switch for controlling the amount of light coupled between the ends of two optical fibers, said switch comprising:

a reflective prism;

means for mounting a first end of said prism adjacent one end of an input optical fiber;

means for mounting a second end of said prism adjacent one end of an output optical fiber;

a variable density filter;

means for rotatably mounting said filter between said prism and said end of said optical filter; and push button means for rotating said filter, the quantity of light being transmitted through said filter being a function of the rotational position of said filter.

* * * * *